(12) United States Patent
Rhoades et al.

(10) Patent No.: US 11,686,332 B1
(45) Date of Patent: Jun. 27, 2023

(54) ACCORDION CLIP

(71) Applicant: NIFCO AMERICA CORP., Canal Winchester, OH (US)

(72) Inventors: William R Rhoades, Canal Winchester, OH (US); Kevin Flaute, Canal Winchester, OH (US); Reis Lehman, Canal Winchester, OH (US)

(73) Assignee: NIFCO AMERICA CORPORATION, Canal Winchester, OH (US)

( * ) Notice: Subject to any disclaimer, the term of this patent is extended or adjusted under 35 U.S.C. 154(b) by 0 days.

(21) Appl. No.: 17/874,749

(22) Filed: Jul. 27, 2022

(51) Int. Cl.
*F16B 5/06* (2006.01)

(52) U.S. Cl.
CPC ............ *F16B 5/065* (2013.01); *F16B 5/0657* (2013.01)

(58) Field of Classification Search
CPC ................................ F16B 5/065; F16B 5/0657
See application file for complete search history.

(56) References Cited

U.S. PATENT DOCUMENTS

| | | | | |
|---|---|---|---|---|
| 4,920,618 A * | 5/1990 | Iguchi | ................... | F16B 13/061 24/297 |
| 5,509,182 A * | 4/1996 | Nakanishi | ............. | F16B 5/0664 24/453 |
| 5,690,454 A * | 11/1997 | Smith | ................... | F16B 13/061 411/908 |
| 5,775,859 A * | 7/1998 | Anscher | ................... | F16B 5/065 411/509 |
| 6,659,701 B1 | 12/2003 | Risdale | | |
| 7,219,400 B2 * | 5/2007 | Tashima | ................ | F16B 5/0642 24/453 |
| 7,641,250 B2 * | 1/2010 | Gambatese | ............ | B60R 13/04 296/213 |
| 2010/0162537 A1 * | 7/2010 | Shiba | ...................... | F16B 5/065 24/458 |
| 2014/0225355 A1 * | 8/2014 | Risdale | ................ | B60R 21/216 24/295 |

\* cited by examiner

*Primary Examiner* — David M Upchurch
(74) *Attorney, Agent, or Firm* — Manabu Kanesaka

(57) ABSTRACT

A fastener for securing a panel to a substructure includes a flange having a bore, a base disposed under the flange and having a post extending upwardly from the base, the post having a retaining member at an upper portion thereof, and at least one flexible hinge resiliently connecting the base and the flange such that when the base is pushed toward the flange, the post with the retaining member passes through the bore adapted to engage with other member. The flange further includes flexible walls formed around the bore and extending outward with retaining clips formed at respective leading ends thereof. The flexible walls bend towards the bore when pressed into the bore.

6 Claims, 5 Drawing Sheets

ACCORDION CLIP

FIELD OF THE INVENTION

The present invention relates to a fastener or accordion clip that can be pre-assembled into a rocker panel for ease the installation of the rocker panel. More specifically, the present invention relates to a fastener that can be pre-assembled into a rocker panel where the fastener is in a recessed position during the installation of the rocker panel to the body panel of a vehicle.

BACKGROUND OF THE INVENTION

When assembling a rocker panel to the frame or body panel of a vehicle, it is common to use injection molded plastic fasteners to quickly secure the panel to the vehicle structure. A typical plastic fastener used in this application is like a screw, having an upper flange or head from which extends a shaft. However, the shaft of such a fastener typically has a retaining structure that engages a bore formed through the structure of the vehicle which the fastener is driven.

Preferably, the plastic fastener will be driven into the structure at relatively low pressures such that special tools are not required to install the fastener. Prior art fasteners may be passed entirely through the part that is to be secured to the substructure or may form a "blind" connection, wherein the head or flange of the fastener is inserted and retained in a structure, sometimes known as a dog house, which extends from the undersurface of the plastic part.

In any case, because the parts with which typical prior art fasteners are used are often fabricated at locations remote from a place where the parts are assembled with, it is preferred to pre-assemble the fasteners with the part with which they are used. In this case, the part may simply be removed from the container in which it was shipped, positioned appropriately with regard to the substructure, and installed by inserting the shafts of the pre-assembled prior art fasteners into appropriate bores formed through the substructure such that the retaining structures on the post of the fasteners can retain the fasteners in the bore in the substructure.

Problems arise, however, where a relatively rigid part, such as the rocker panel, is used in a plurality of fasteners that is misaligned with one another. In such a case, it may be possible to properly install one or more fasteners or groups of fasteners that are aligned with one another, i.e., the axes along which the shafts of the fasteners extend being substantially parallel with one another, but difficult to install other, distinct fasteners or groups of fasteners that are not directly aligned with those fasteners or groups of fasteners that were first installed. In these instances, pre-assembly of the fasteners with the part may be contraindicated as assembly of the part with its substructure may be difficult or impossible without damage to one or more fasteners or even the part itself. In these cases, it is desirable to utilize specially adapted fasteners that facilitate pre-assembly of the part with its requisite fasteners.

U.S. Pat. No. 6,659,701 discloses a rocker panel fastener for assembling a panel structure to a substructure. However, the panel fastener can only assemble the panel with a slit to the substructure.

The present invention has been made to obviate the problems of the prior art, and has an object to provide an accordion clip which can be easily applied to assemble many kind of panels.

Other objects and advantages of the invention will be apparent from the following description of the invention,

SUMMARY OF THE INVENTION

The present invention is directed to a fastener for securing, such as a rocker panel to a body panel of a vehicle. The fastener for securing a panel to a substructure comprises a flange having a bore, and flexible walls formed around the bore and extending outward from the flange with retaining clips formed at respective leading ends thereof, the flexible walls bending inward towards the bore when pressed into the bore; a base disposed under the flange and having a post extending upwardly from the base, the post having a retaining member at an upper portion thereof; and at least one flexible hinge resiliently connecting the base and the flange such that when the base is pushed toward the flange, the post with the retaining member passes through the bore adapted to engage with another member.

The retaining member is constructed and arranged to securely retain the post of the fastener within a bore formed in the substructure when the fastener is moved from a first, pre-assembled position to a second, fully assembled position.

It is to be understood that the fastener of the present invention is well adapted for pre-assembly with a panel by inserting the fastener, open or tubular, a hole or slot formed in a panel structure. When pre-assembled with the panel, the flange and the retaining member of the fastener are positioned on opposing sides of the panel structure. The fastener may be aligned with other fasteners pre-assembled with the panel or may be pre-assembled with one more of the fasteners out of alignment with the remaining fasteners. The pre-assembly of the fastener with a panel and the subsequent assembly of the panel with its substructure are facilitated by the fact that the tip of the post of the head of the fastener may be substantially withdrawn into the hollow support structure when the head of the fastener is in a first, pre-assembled position.

One area where the invention is particularly useful is in the assembly of a rocker panel of an automobile to the frame of the automobile.

BRIEF DESCRIPTION OF THE DRAWINGS

The present invention will be more understood by referencing the following descriptions in conjunction with the accompanying drawings, in which.

DETAILED DESCRIPTION OF THE INVENTION

An accordion clip 1 of the present invention is constructed and arranged to be pre-assembled with a rocker panel 13 of an automobile. The accordion clip 1 is generally used to secure the rocker panel 13 to a body panel 16 of an automobile.

Structure of the Accordion Clip

Figure 1:
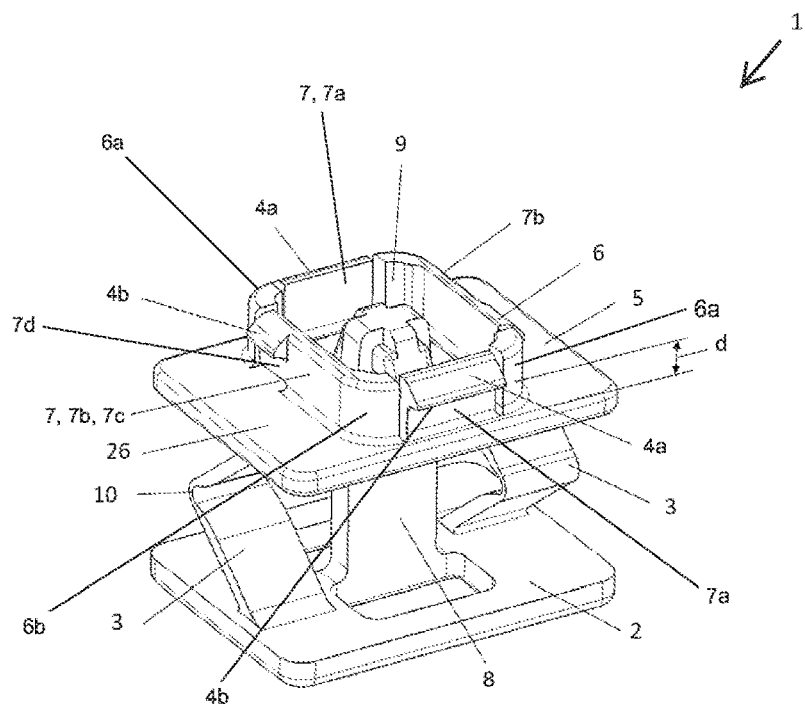
FIG. 1 shows an isometric view of the accordion clip in its pre-assembled position.
Figure 2:
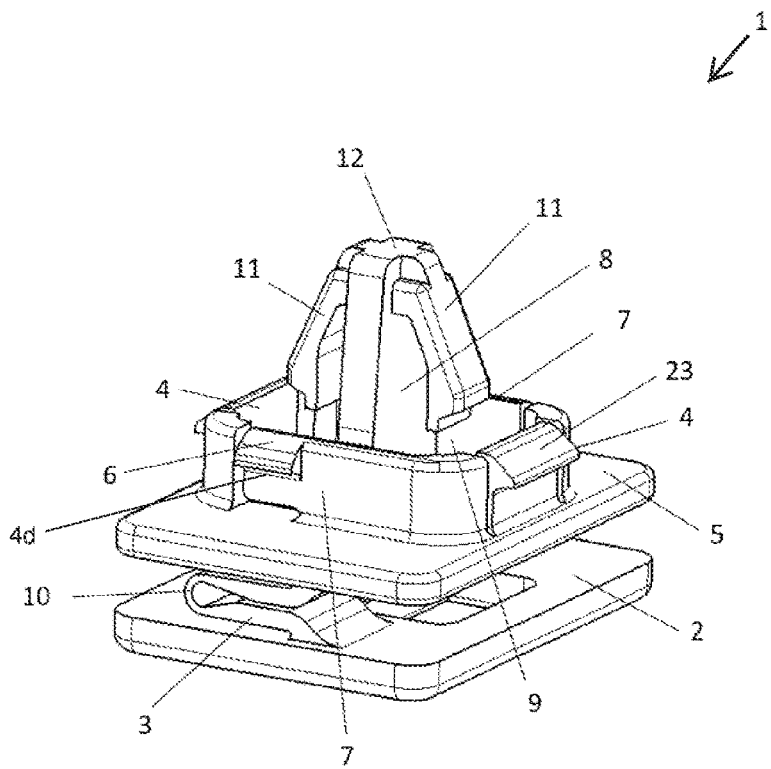
FIG. 2 shows an isometric view of the accordion clip in its assembled position.

FIG. 1 and FIG. 2 show the accordion clip 1 comprising a base 2, a flange 5, and a flexible hinge 3. The flange 5 has flexible walls 7 extending upward from the flange 5 with retaining clips 6 that are formed at the respective leading ends, creating a hollow support bore 9 that passes entirely therethrough in a longitudinal direction. The flexible walls 7 surrounding the hollow support bore 9 may be of any suitable shape but is in a preferred embodiment of generally rectangular shape. The flange 5 have retaining clips 4, i.e. tapered clips 4a, 4b, formed at the respective leading end of the flexible walls 7 and spaced apart by an offset distance d. This offset distance d is dictated by the thickness of the rocker panel 13 with which the accordion clip 1 is pre-assembled.

In particular, the flexible walls 7 include a pair of first side walls 7a facing each other with the bore 9 interposed therebetween and having first tapered clips 4a with a rear side 4b extending outwardly, and a pair of second side walls 7b facing each other with the bore 9 interposed therebetween.

Each of the pair of second side walls 7b includes one portion 7c fixed to the flange 5, and another portion 7d extending laterally from the one portion 7c without being fixed to the flange 5 and having a second tapered clip 4c with a rear side 4d extending outwardly.

The flange 5 further includes non-flexible corner portions 6a, 6b. The corner portion 6a is arranged to have a space with respect to the first side wall 7a and a space with respect to the another portion 7d. The corner portion 6b is integrally connected, at one side, with the one portion 7c, and is spaced with the first side wall 7a.

As shown in FIG. 1, the pair of first side walls 7a extends parallel to each other, and the pair of second side walls 7b extends parallel to each other and perpendicular to the pair of first side walls 7a. The first and second side walls 7a, 7b are configured to enter into a hole of the panel from a lower side or a slit of the panel from a lateral side.

The base 2 includes two hinges 3 connecting the base 2 and the flange 5, and a post 8 extending upwardly from the base 2. The hinge 3 has a bend point 10 in the middle thereof so that the hinge 3 can bend. Thus, when the base 2 is pushed upwardly, the base 2 can move close to the flange 5 while the post 8 passes the bore 9.

The post 8 includes a retaining member 12 having a pair of anchors 11 so that the pair of anchors 11 is arranged to enter a hole of another panel. Namely, when the post 8 is pushed upwardly, the retaining member 12 engages an edge of the hole of another panel, and the pair of anchors 11 bends inwardly to pass the hole therethrough. After passing the hole, the pair of anchors 11 returns to the original shapes, so that the post cannot be disengaged from the another panel.

Accordion Clip Pre-Assembly in Rocker Panel Hole

Figure 3:
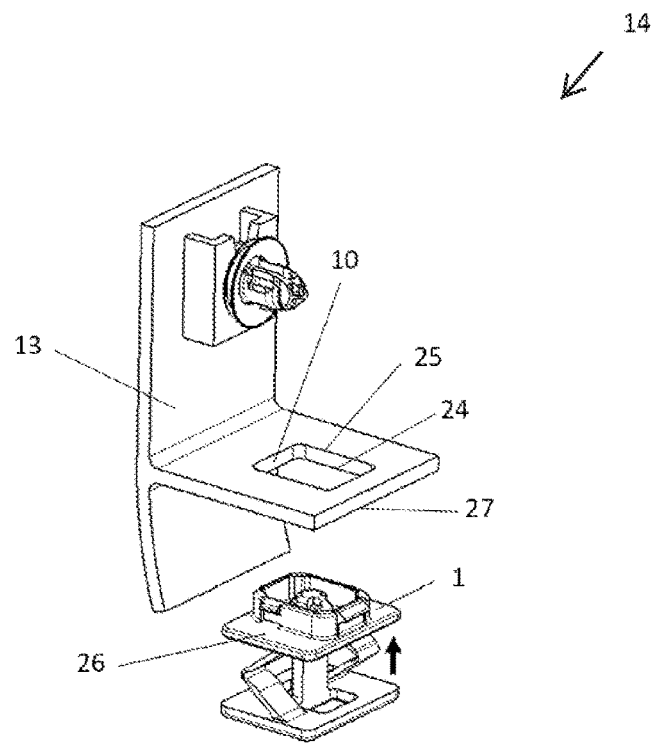
FIG. 3 shows an exploded isometric view of a rocker panel assembly.
Figure 4:
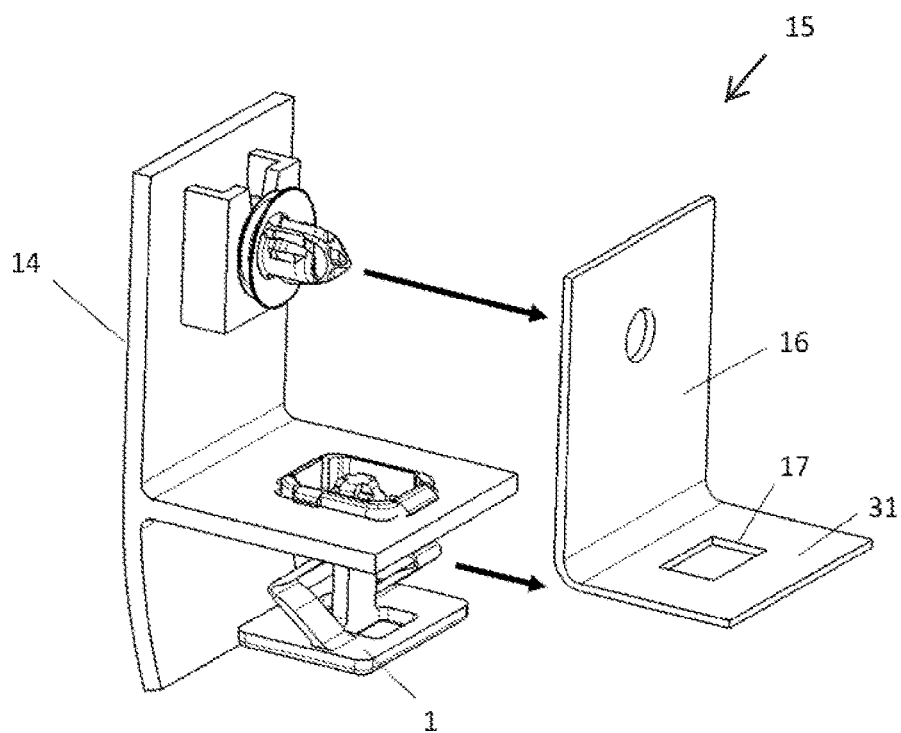
FIG. 4 shows an exploded isometric view of the body panel assembly.

The accordion clip 1 of the present invention is pre-assembled with the rocker panel 13 by inserting the flexible walls 7 of the body 21 into a formed hole 10 in the rocker panel 13. Force is applied to the flange 5 causing the flexible walls 7 to flex inwards toward the hollow support bore 9 as the clip surfaces 23 of the retaining clips 4 contact the lower edge 24 of the formed hole 10. Continued applied force to the flange 5 pushes the body 21 of the accordion clip 1 up until the top surface 26 of the flange 5 contacts the bottom surface 27 of the rocker panel 13 as the flexible walls 7 flex back to their original position causing retaining clips 4 to come to rest over the upper edge 25 of the rocker panel 13 securing the accordion clip 1 to the rocker panel 13, as seen in FIG. 3 and FIG. 4.

Figure 5A:
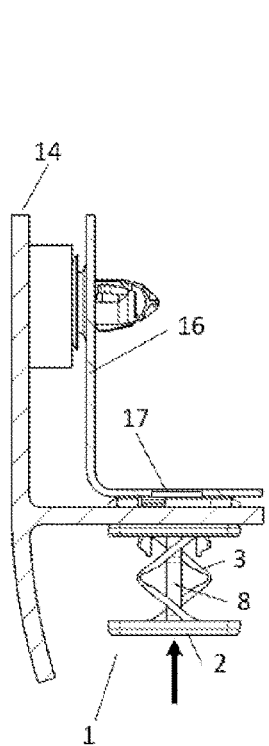
FIGS. 5(a)-5(c) show a sequence of cross-sectional views of the accordion clip being installed in the body panel assembly.
Figure 5B:
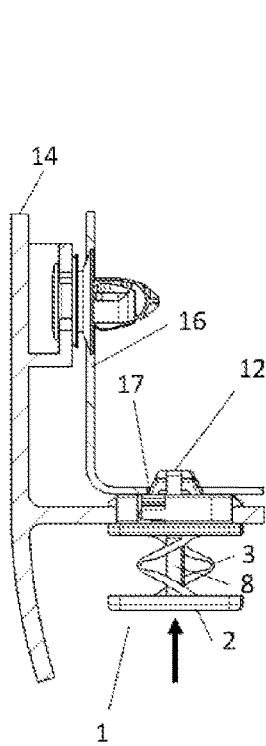
Figure 5C:
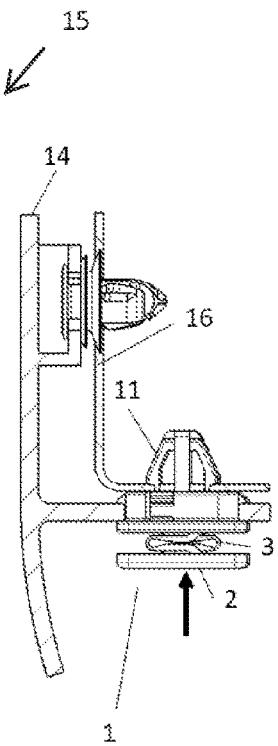
Figure 6:
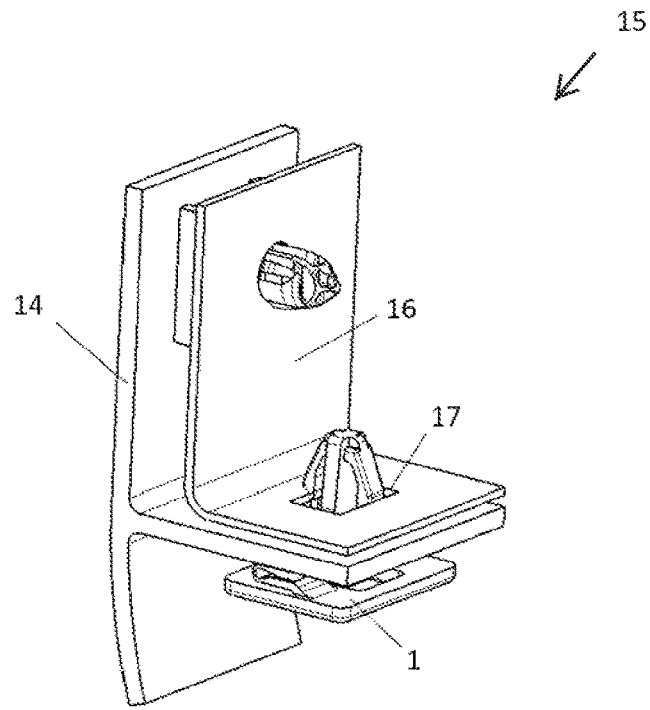
FIG. 6 shows an isometric view of a body panel assembly.

Pre-Assembled Rocker Assembly with Hole in Use:

Once the accordion clip 1 has been pre-assembled with the rocker panel 13, the rocker panel assembly 14 may be transported, if necessary, to the location where the rocker panel 13 is to be assembled with the body panel 16. The rocker panel 13 is then oriented about the body panel 16 and force is applied to the base 2 of the head 22 of the accordion clip 1, see FIG. 5a. This force drives the post 8 of the accordion clip 1 into a bore 17 which is aligned therewith. As the post 8 is inserted into the bore 16, the force applied to the base 2 also acts to bend or fold the flexible hinges 3 from the initial position as illustrated in FIG. 5b, to their fully folded position as illustrated in FIG. 5c. The post 8 of the head 22 is inserted into the bore 17 to the extent necessary for the retaining mechanisms 12 extending laterally from the post 8 to engage the body panel 16. The anchor arms 11 compress inward as they pass through the bore 17 and then expand back to their original position engaging the top surface 31 of the body panel 16 securing the rocker panel assembly 18 to the body panel 16, as seen in FIG. 6.

Accordion Clip Pre-Assembly in Rocker Panel Slot

Figure 7:
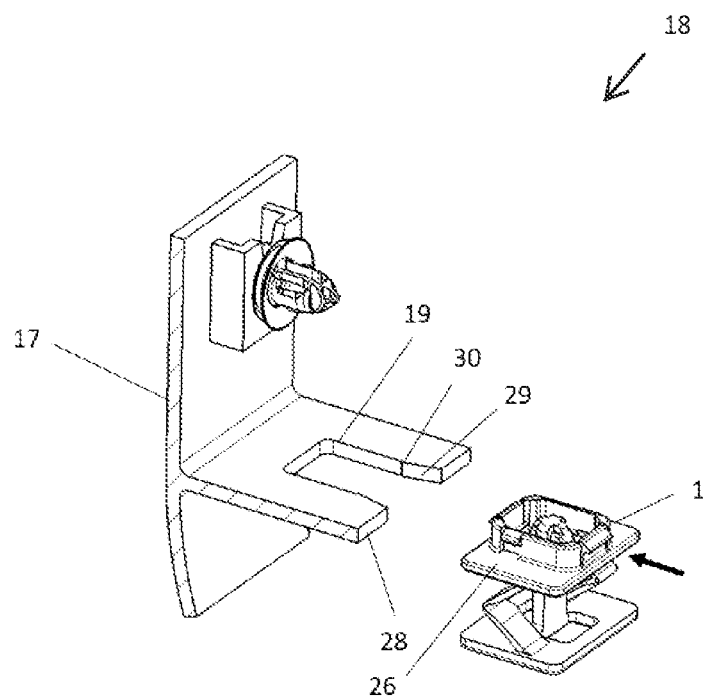
FIG. 7 shows an exploded isometric view of a rocker panel assembly.
Figure 8:
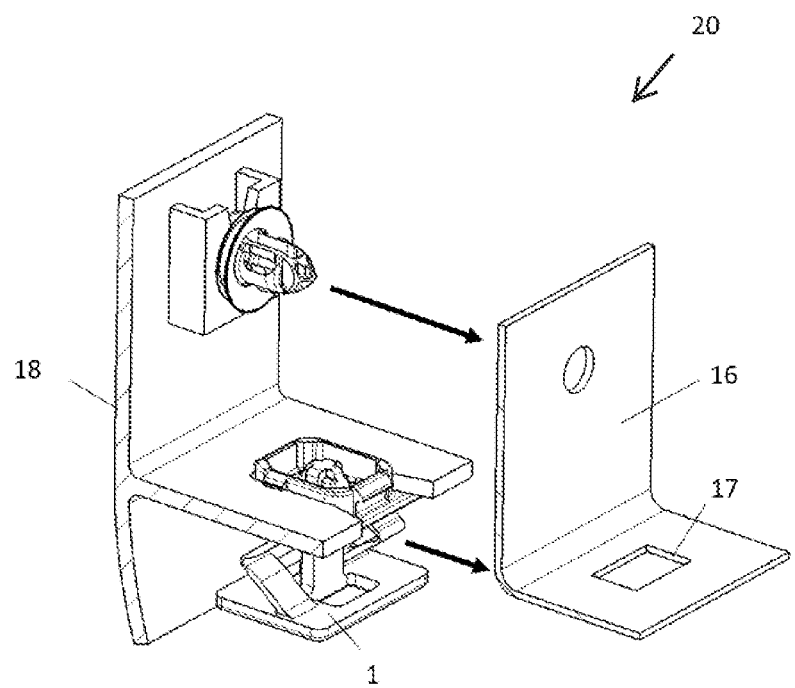
FIG. 8 shows an exploded isometric view of a body panel assembly.

The accordion clip 1 of the present invention is pre-assembled with the rocker panel 17 by sliding the flange 5 of the accordion clip 1 into the slot 19 of the rocker panel 17. The top surface 26 of the base 5 is placed against the bottom surface 28 of the rocker panel 17. Force is applied to the side of the base 5 guiding the flexible walls 7 into the slot ramp 29. The flexible walls 7 flex inward toward the hollow bore 9 as they pass thru the edges of the slot detents 30. With continued force applied to the base 5, the flexible walls 7 flex back to their original position once they pass the slot detents 30 securing the accordion clip 1 to the rocker panel 17, see FIG. 7 and FIG. 8.

Pre-Assembled Rocker Assembly with Slot in Use:

Once the accordion clip 1 has been pre-assembled with the rocker panel 17, the rocker panel assembly 18 may be transported, if necessary, to the location where the rocker panel 17 is to be assembled with the body panel 16. The rocker panel 17 is then oriented about the body panel 16 and force is applied to the base 2 of the head 22 of the accordion clip 1, see FIG. 9(a).

Figures 9A, 9B, 9C:
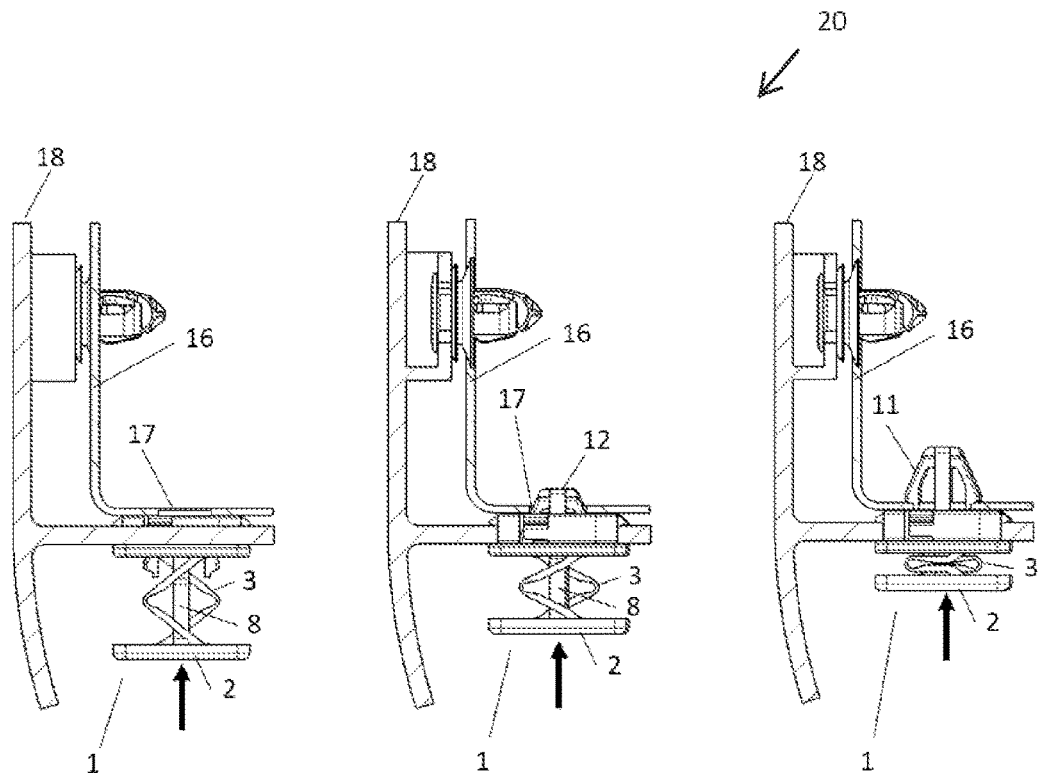
FIGS. 9(a)-9(c) show a sequence of cross-sectional views of the accordion clip being installed in the body panel assembly.
Figure 10:
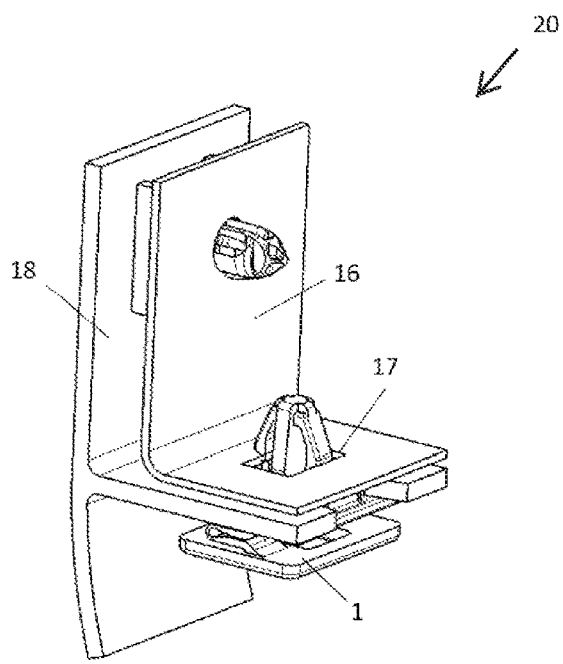
FIG. 10 shows an isometric view of a body assembly.

This force drives the post 8 of the accordion clip 1 into a bore 17 which is aligned therewith. As the post 8 is inserted into the bore 16, the force applied to the base 2 also acts to bend or fold the flexible hinges 3 from the initial position as illustrated in FIG. 9b, to their fully folded position as illustrated in FIG. 9c. The post 8 of the head 22 is inserted into the bore 17 to the extent necessary for the retaining member 12 extending laterally from the post 8 to engage the body panel 16. Anchor arms 11 are compressed inward as they pass through the bore 17, and then expand back to their original position engaging the top surface 31 of the body panel 16 securing the rocker panel assembly 18 to the body panel 16, as seen in FIG. 10.

While the foregoing written description of the invention enables one of ordinary skill to make and use what is considered presently to be the best mode thereof, those of ordinary skill will understand and appreciate the existence of variations, combinations, and equivalents of the specific exemplary embodiments herein. The invention is therefore to be limited not by the exemplary embodiments herein, but by all embodiments within the scope and spirit of the appended claims.

What is claimed is:

1. A fastener for securing a panel to a substructure, comprising:
   a flange having a bore, and flexible walls formed around the bore and extending outward from the flange with retaining clips formed at respective leading ends thereof, the flexible walls bending towards the bore when pressed into the bore;
   a base disposed under the flange and having a post extending upwardly from the base, the post having a retaining member at an upper portion thereof; and
   at least one flexible hinge resiliently connecting the base and the flange such that when the base is pushed toward the flange, the post with the retaining member passes through the bore adapted to engage with another member.

2. The fastener according to claim 1, wherein the flexible walls include a pair of first side walls facing each other with the bore interposed therebetween and having first tapered clips with a rear side extending outwardly, and a pair of second side walls facing each other with the bore interposed therebetween.

3. The fastener according to claim 2, wherein each of the pair of second side walls includes one portion fixed to the flange, and another portion extending laterally from the one portion without being fixed to the flange and having a second tapered clip with a rear side extending outwardly.

4. The fastener according to claim 3, wherein the flange further includes non-flexible portions sandwiching each of the pair of first side walls.

5. The fastener according to claim 2, wherein the pair of first side walls extends parallel to each other, and the pair of second side walls extends parallel to each other and perpendicular to the pair of first side walls so that the first and second side walls are configured to enter into a hole of the panel from a lower side or a slit of the panel from a lateral side.

6. The fastener according to claim 5, wherein the retaining member includes a pair of anchors so that the pair of anchors is arranged to enter a hole of another panel.

* * * * *